(12) United States Patent
Kuhny et al.

(10) Patent No.: US 10,234,324 B2
(45) Date of Patent: Mar. 19, 2019

(54) APPARATUS FOR DETERMINING AND/OR MONITORING A PROCESS VARIABLE

(75) Inventors: Jutta Kuhny, Lörrach (DE); Helmut Pfeiffer, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 1880 days.

(21) Appl. No.: 12/224,544

(22) PCT Filed: Mar. 9, 2007

(86) PCT No.: PCT/EP2007/052209
§ 371 (c)(1),
(2), (4) Date: Jan. 21, 2009

(87) PCT Pub. No.: WO2007/107459
PCT Pub. Date: Sep. 27, 2007

(65) Prior Publication Data
US 2009/0126480 A1    May 21, 2009

(30) Foreign Application Priority Data
Mar. 21, 2006 (DE) .................. 10 2006 013 255

(51) Int. Cl.
*G01F 23/296* (2006.01)
(52) U.S. Cl.
CPC ................ *G01F 23/2966* (2013.01)
(58) Field of Classification Search
None
See application file for complete search history.

(56) References Cited

U.S. PATENT DOCUMENTS

| 3,349,604 A * | 10/1967 | Banks ............... 73/32 A |
| 3,718,897 A | 2/1973 | Abbott |
| 5,524,486 A * | 6/1996 | Hermann ............ 73/290 V |
| 2006/0058706 A1 | 3/2006 | Frey |
| 2006/0144139 A1 * | 7/2006 | Miyagawa .......... 73/290 V |

FOREIGN PATENT DOCUMENTS

| DE | 10 2004 033 311 A1 | 1/2006 |
| EP | 1 102 044 A1 | 5/2001 |
| EP | 1 134 038 A1 | 9/2001 |
| FR | 2 553 189 A1 | 4/1985 |

\* cited by examiner

*Primary Examiner* — Robert R Raevis
(74) *Attorney, Agent, or Firm* — Bacon & Thomas, PLLC

(57) ABSTRACT

Apparatus for determining and/or monitoring at least one process variable of a medium in a container. The apparatus includes at least one mechanically oscillatable unit, and at least one driving/receiving unit, which excites the mechanically oscillatable unit to execute mechanical oscillations, and which receives the mechanical oscillations of the mechanically oscillatable unit. The mechanically oscillatable unit has at least one membrane, or diaphragm. The membrane, or diaphragm, is connected with a housing. The driving/receiving unit is arranged between the membrane and a holding portion, and the holding portion is secured to the housing. The invention holding portion is embodied in such a manner and secured to the housing in such a manner, that a radial force, which acts essentially in the direction of the normals of the housing, produces a force component and/or a moment, which acts essentially in the direction of a normal of the holding portion.

8 Claims, 2 Drawing Sheets

APPARATUS FOR DETERMINING AND/OR MONITORING A PROCESS VARIABLE

TECHNICAL FIELD

The invention relates to an apparatus for determining and/or monitoring at least one process variable of a medium in a container. The apparatus includes: At least one mechanically oscillatable unit; and at least one driving/receiving unit, which excites the mechanically oscillatable unit to execute mechanical oscillations, and which receives the mechanical oscillations of the mechanically oscillatable unit; wherein the mechanically oscillatable unit has at least one membrane, or diaphragm; wherein the membrane, or diaphragm, is connected with a housing; wherein the driving/receiving unit is arranged between the membrane, or diaphragm, and a holding portion; and wherein the holding portion is secured to the housing. The process variable is, for example, fill-level, density or viscosity. The medium is, for example, a liquid or a bulk good.

BACKGROUND DISCUSSION

Known in the state of the art are so-called oscillatory forks and also so-called single-rods, with which, for example, the fill-level of a medium is measurable. For such purpose, the oscillatory fork or the single-rod is excited to execute mechanical oscillations. The characterizing variables of the oscillations, amplitude, frequency and phase, depend on, among other things, whether the oscillatable unit—in the case of the fork, the two fork tines—are oscillating freely or covered by the medium. Thus, for example, in the case of liquids, the frequency falls, when the fork or the single-rod transitions from the uncovered state to the covered state. Therefore, it is possible, by evaluating frequency, to deduce the fill-level. Often, such measuring devices are used for limit-level monitoring. In such case, one distinguishes between monitoring a lower (min-protection) and an upper (max-protection), limit level. The pertinent limit-level depends, in such case, on the installation height and the dimensioning of the measuring device and especially the dimensioning of the oscillatable unit. The oscillatable unit is, most often, secured on a membrane, or diaphragm, behind which the driving/receiving unit is located. The driving/receiving unit serves for exciting the oscillatable unit to execute oscillations and also for receiving the oscillations. The driving/receiving unit is often a piezoelectric element, which changes an electrical, alternating voltage into a mechanical oscillation, or, in reverse, mechanical oscillations into an alternating voltage. Evaluation of the alternating voltage permits, then, the ascertaining of the characterizing variables of the oscillation. In an embodiment, such as described, for example, in EP 1 134 038 A1, the driving/receiving unit is a stack of piezoelectric elements, which is secured between a hemisphere and a disk. This stack is pressed against the membrane, or diaphragm, under a certain prestress, in order to achieve an optimal force transfer.

A problem for this construction arises in the case of high temperature applications. If a temperature jump occurs, then, due to the different coefficients of expansion of the membrane, or the housing, of the measuring device and the driving/receiving unit, and due to the time for uniform spreading of the temperature in the measuring device, it can happen, that, for a certain time, contact is lost between driving/receiving unit and the membrane, or diaphragm. This, of course, means that the measurements worsen or even become impossible. This is intolerable, especially for safety-relevant, fill-level monitoring.

SUMMARY OF THE INVENTION

An object of the invention is, therefore, to provide a measuring device, which assures contact between driving/receiving unit and membrane, or diaphragm, also in high temperature applications.

The invention achieves the object by the features, that the holding portion is embodied in such a manner and secured to the housing in such a manner, that a radial force (Frad), which acts essentially in the direction of normals (N1) to the housing, produces a force component and/or a moment (Md), which acts essentially in the direction of a normal (N2) to the holding portion. Through the invention, thus, a radial force Frad, which results from the occurrence of a temperature gradient, is used to press the driving/receiving unit against the membrane, or diaphragm. The radial force Frad acts, most often, outwardly. In an embodiment, the part of the housing, to which the holding portion is secured, is a tubular unit. In this case, involved is the normal, which is perpendicular to the tube. The two normals, N1 of the housing, or of the tube of the housing, and the normal N2 of the holding portion, are, in such case, especially, essentially perpendicular to one another.

An embodiment provides, that the holding portion has at least one plate and one inclined portion, that the plate and the inclined portion are embodied in such a manner and matched to one another in such a manner, that the plate and the inclined portion form an angle ($\alpha$) with one another, and that the holding portion is connected with the housing via the inclined portion. This embodiment permits production of a moment, which, by suitable choice of geometry, has a force component in the desired direction.

An embodiment includes, that the driving/receiving unit is arranged in the direction of the normal (N2) of the plate. In an embodiment, the symmetry axis of the driving/receiving unit is perpendicular to the plate unit and, thus, in the direction of the normal (N2). In other words: The driving/receiving unit is perpendicular to the plate, which, in such case, is, especially, a form of disk. Through the structure of the invention for the measuring apparatus, therefore, the moment produces a force in direction of the normal N2 and, thus, in the direction of the symmetry axis of the driving/receiving unit, which is, for example, a piezo-stack.

An embodiment provides, that the angle ($\alpha$) lies essentially between 40° and 60°. This angle has proved itself as especially advantageous. In an embodiment, the angle amounts, especially, to about 45°.

An embodiment includes, that the inclined portion is embodied in such a manner, that a plane, in which the plate is located, and a plane, in which a connection region between the inclined portion and the housing is located, are separated by a distance (a). In order to obtain a moment which is as large as possible and, associated therewith, a force which is as large as possible, the distance a should be as large as possible, i.e. it should provide a moment arm which is as large as possible for changing the radial force Frad into a moment Md with a component in the direction of the driving/receiving unit.

An embodiment provides, that the distance (a) is such that the plate lies, in the direction from the membrane, or diaphragm, behind the connection region. Since the driving/receiving unit preferably has the same geometry, i.e. especially the same height, as in the state of the art, the connection region lies a distance a higher in direction of the membrane, or diaphragm, than in the state of the art.

An embodiment includes, that the holding portion and the housing have essentially equal length-coefficients of expansion.

An embodiment provides, that the holding portion, the housing, and the membrane, or diaphragm, are essentially rotationally symmetric. The relevant part of the housing with reference to the invention is, thus, especially, a tube.

An embodiment includes, that the holding portion is connected with a tube as part of the housing. An embodiment provides, that the mechanically oscillatable unit has at least one oscillatory rod. In an additional embodiment, two oscillatory rods are provided, so that, for example, a so-called oscillatory fork is involved.

The invention will now be explained in greater detail on the basis of the appended drawings, the figures of which show as follows:

DETAILED DISCUSSION

Figure 1:
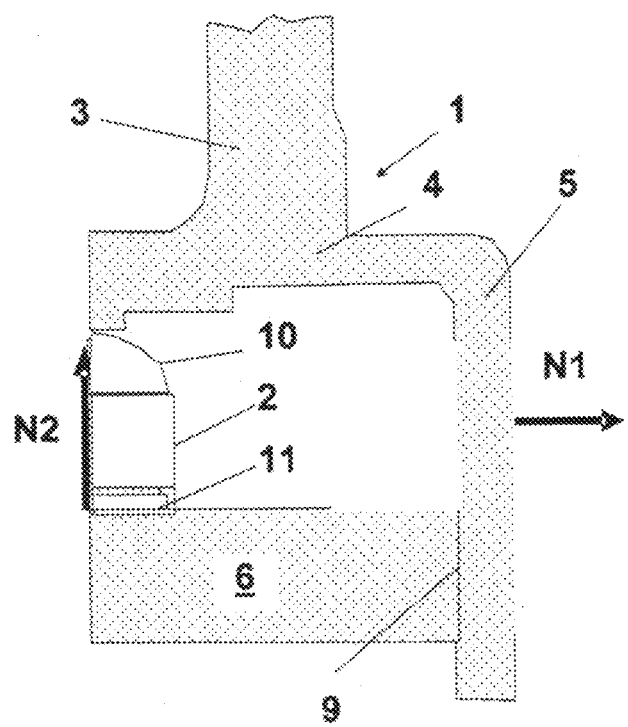
FIG. 1 a section through a measuring device according to the state of the art.

FIG. 1 shows a section through a schematic illustration of a measuring device according to the state the art. The mechanically oscillatable unit 1 is, in this instance, composed of two rods 3, which are embodied symmetrically relative to one another and secured on the membrane, or diaphragm, 4. Thus, here, half of a so-called oscillatory fork is shown. Evaluation of the mechanical oscillations of the oscillatable unit 1 permits the determining and/or monitoring of different process variables. If of concern, in such case, is, for example, the fill-level of a medium in a container, then a lowered oscillation frequency, in the case of liquids, or oscillation amplitude, in the case of bulk goods, is a sign that a fill-level has been reached and the oscillatable unit 1 is now covered by the medium.

The membrane, or diaphragm, 4 is connected with a housing 5, in which also the electronic components (not shown) are located. In particular, here, the membrane, or diaphragm, 4 is connected with a tube, as part of the housing, and the tube contains the mechanics of the measuring device. Thus, a driving and receiving (driving/receiving) unit 2 is, here, a stack of piezoelectric elements, which are arranged between a hemisphere 10 and a disk 11. The driving/receiving unit 2 is clamped, under prestress, between the membrane, or diaphragm, 4 and the holding portion 6. The holding portion 6 is, here, a metal plate, which is connected at its peripheral connection region 9 with the housing 5, i.e. with the above-mentioned tube. The holding portion 6 is, here, likewise as the housing 5, and the membrane, or diaphragm, 4, embodied rotationally symmetrically. The bearing region of the driving/receiving unit 2 is located at the same height as the connection region 9.

In use, a temperature change affects, first, the oscillatable unit 1 with the membrane, or diaphragm, 4, and then, with delay, the remaining housing 5 or the driving/receiving unit 2. Due to the different coefficients of expansion of membrane, or diaphragm, 4 and the driving/receiving unit 2, there is experienced a reduction, or, depending on the size of the temperature change, a loss, of the prestress, i.e. the driving/receiving unit 2 loses, in the extreme case, during the transient process, contact with the membrane, or diaphragm, 4. This problem is solved by the embodiment of the invention shown in FIG. 2.

Figure 2:
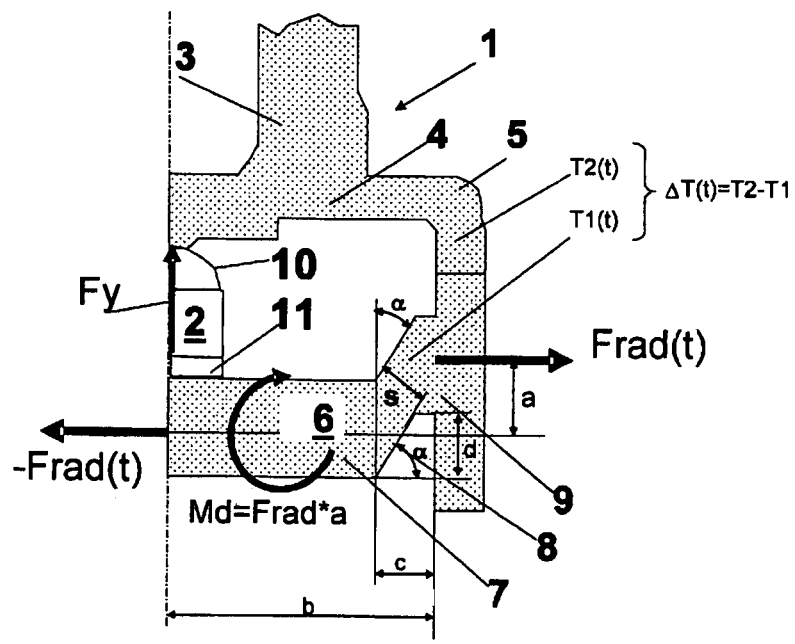
FIG. 2 a section through a measuring device of the invention.

FIG. 2 shows a measuring device of the invention. The same reference characters as in FIG. 1 hold here also. In contrast to the state of the art in FIG. 1, here, holding portion 6 is composed of a plate 7 and an inclined portion 8. Both plate 7 and portion 8 form an angle $\alpha$ relative to one another, which, here, amounts to about 45°. An increase up to 60° strengthens the effects, so long as the wall thickness s is maintained. The plate 7 of the holding portion 6 is connected via the inclined portion 8 with the tube of the housing 5 at the, also here, rotationally symmetric, connection region 9. Through the angle $\alpha$, the securement of the connection 9 is moved closer to the membrane, or diaphragm, 4, in comparison with the state of the art, as shown in FIG. 1. The piezo-stack of the driving/receiving unit 2 has, in such case, the same height as in the state of the art in FIG. 1. Thus, also the two planes have the separation a. So, if, in FIG. 1, the bearing region of the driving/receiving unit 2 is located at the height of the connection region 9, then, here, the bearing region lies behind the connection region 9 by the distance a.

The behavior of the sensor with respect to time in the case of a theoretical temperature shock from 20° C. to 300° C. is such, that the tube wall of the sensor is already exposed to the full temperature after two seconds, while the holding portion 6 has a temperature of only about 50° C. after two seconds. The associated temperature gradient of about 250° C. causes a temperature stress in the sensor tube of the housing 5, which, however, is prevented by the holding portion 6 in the connection region 9 from following the radial shifting of the surrounding material of the housing 5. Therefore, a very high radial force Frad is established between the holding portion 6 and the tube of the housing 5. This force acts, in such case, essentially in the direction of the normals N1 of the housing 5.

With the construction of the invention, due to the offset position of the plate 7 relative to the connection region 9 and due to the symmetry axis, a right-turning moment $Md=Frad*a$ arises, which has a force component in the direction of the normal N2 to the holding portion 6, and, thus, in the direction of the membrane, or diaphragm, 4. This results, as a function of time, in a stroke movement of the driving/receiving unit 2, which assures, that the driving/receiving unit 2 always stays in contact with the sensor membrane 4. Thus, it is assured, that, also during the temperature shock, the functionality of the sensor is maintained. Moment Md is larger, the larger a is. As can be seen in FIG. 2, the distance d increases as $\alpha$ becomes larger, which leads thereto, that also the moment Md increases correspondingly. The increasing of the angle $\alpha$ has, however, a limit, since the stiffness of the holding portion 6 and, especially, the inclined portion 8 must be maintained large enough for transferring the force.

Holding portion 6, or plate 7, is, in such case, per se, sufficiently stiff. Especially, it is clearly stiffer than the bending stiffness of the membrane, or diaphragm, 4, since, otherwise, a part of the movement of the piezo-stack, as driving/receiving unit 2, is transferred to the holding portion 6, i.e. the oscillatory movements of the rods 3 are otherwise smaller. The same is true for the inclined portion 8. Also it should be sufficiently stiff, since, otherwise, when the moment is acting during the temperature jump, the inclined portion 8 deflects resiliently, and, thus, less pressing force Fy is produced.

The effect the construction of the invention achieves is briefly summarized on the basis of the sketch as follows:

1. A temperature gradient arises between holding portion 6 and housing tube 5.

2. As a result of this, tube 5 attempts to pull the holding portion 6 in the direction N1, i.e. the radial force Frad(t) comes into being.

3. Through the offset arrangement of the holding portion 6, composed, according to the invention, of the plate 7 and the inclined portion 8, on the tube 5, i.e. at the distance a, a corresponding reaction force, −Frad(t), is also present.

4. This leads to a moment Md=Frad*a acting in the clockwise direction.

5. Because of the acting moment, an axial force results in the N2-direction. Since Md=Fy*b, it follows that Fy=a/b*Frad.

6. Thus, the force, which acts on the piezo-stack 2 because of the moment, depends on the two distances a and b.

Numerical calculations have shown for such case, that the angle $\alpha$ lies optimally between 40° and 60°.

The invention claimed is:

1. An apparatus for determining and/or monitoring at least one process variable of a medium in a container, comprising:
   at least one mechanically oscillatable unit; and
   at least one driving and receiving unit, which excites said mechanically oscillatable unit to execute mechanical oscillations, and which receives the mechanical oscillations of said mechanically oscillatable unit, wherein:
   said mechanically oscillatable unit has a housing, a holding portion, and at least one membrane, or diaphragm, said membrane, or diaphragm, is connected with said housing;
   said driving and receiving unit is arranged between said membrane, or diaphragm, and said holding portion in such a manner that said holding portion presses said driving and receiving unit against said membrane, or diaphragm;
   said holding portion is secured to said housing;
   said holding portion has at least one plate and an inclined portion, said plate and said inclined portion are embodied in such a manner and matched to one another in such a manner, that said plate and said inclined portion form an angle with one another;
   said holding portion is connected via said inclined portion with said housing;
   said driving and receiving unit is arranged in the direction of a normal of said plate; and
   said holding portion is embodied in such a manner and secured to said housing in such a manner, that a radial force, which acts essentially in direction of normals of said housing, produces a force component and/or a moment, which acts essentially in the direction of said normal of said plate.

2. The apparatus as claimed in claim 1, wherein:
the angle lies essentially between 40° and 60°.

3. The apparatus as claimed in claim 1, wherein:
said inclined portion is embodied in such a manner, that a plane, in which said plate is located, and a plane, in which a connection region between said inclined portion and said housing is located, are separated by a distance (a).

4. The apparatus as claimed in claim 3, wherein:
the distance (a) is such that said plate lies, in the direction from said membrane, or diaphragm, behind said connection region.

5. The apparatus as claimed in claim 1, wherein:
said holding portion and said housing have essentially equal length-coefficients of expansion.

6. The apparatus as claimed in claim 1, wherein:
said holding portion, said housing and said membrane, or diaphragm, are embodied essentially rotationally symmetrically.

7. The apparatus as claimed in claim 1, wherein:
said holding portion is connected with a tube as part of said housing.

8. The apparatus as claimed in claim 1, wherein:
said at least one mechanically oscillatable unit has at least one oscillatory rod.

* * * * *